United States Patent
Ellis et al.

(10) Patent No.: US 11,709,785 B2
(45) Date of Patent: Jul. 25, 2023

(54) JUST-IN-TIME POST-PROCESSING COMPUTATION CAPABILITIES FOR ENCRYPTED DATA

(71) Applicant: WESTERN DIGITAL TECHNOLOGIES, INC., San Jose, CA (US)

(72) Inventors: Robert Ellis, Phoenix, AZ (US); Brent Jacobs, Rochester, MN (US); Kevin O'Toole, Chandler, AZ (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 168 days.

(21) Appl. No.: 16/914,201

(22) Filed: Jun. 26, 2020

(65) Prior Publication Data

US 2021/0406200 A1    Dec. 30, 2021

(51) Int. Cl.
    *G06F 12/14*      (2006.01)
    *G06F 12/02*      (2006.01)
    (Continued)

(52) U.S. Cl.
    CPC ........ *G06F 12/1408* (2013.01); *G06F 9/4552* (2013.01); *G06F 12/0246* (2013.01);
    (Continued)

(58) Field of Classification Search
    CPC ............... G06F 12/1408; G06F 9/4552; G06F 12/0246; G06F 12/0853; G06F 21/602; G06F 21/78
    See application file for complete search history.

(56) References Cited

U.S. PATENT DOCUMENTS 6,088,802 A * 7/2000 Bialick .................. G06F 21/34
                                             726/3
6,351,813 B1 * 2/2002 Mooney ................ G06F 21/606
                                            380/278

(Continued)

OTHER PUBLICATIONS

Xie et al., "AIM: Fast and Energy-Efficient AES In-Memory Implementation for Emerging Non-volatile Main Memory", Design, Automation & Test in Europe, (2018), pp. 625-628.

(Continued)

*Primary Examiner* — Ayoub Alata
(74) *Attorney, Agent, or Firm* — ArentFox Schiff LLP

(57) ABSTRACT

Aspects of a storage device including a memory and an encryption core are provided. The storage device may be configured for providing secure data storage, as well as one or more post-processing operations to be performed with the data. The encryption core, which may be configured to decrypt data, may control execution of one or more post-processing operations using the data. A read command received from a host device may include a tag associated with data identified by the read command. When encrypted data is retrieved from memory according to the read command, the encryption core may decrypt the encrypted data and provide the decrypted data for post-processing based on the tag. A corresponding post-processing operation may return a result when executed using the decrypted data. Rather than raw data identified by the read command, the result may be delivered to the host device in response to the read command.

20 Claims, 6 Drawing Sheets

(51) Int. Cl.
*G06F 21/60* (2013.01)
*G06F 9/455* (2018.01)
*G06F 21/78* (2013.01)
*G06F 12/0853* (2016.01)

(52) U.S. Cl.
CPC ........ *G06F 12/0853* (2013.01); *G06F 21/602* (2013.01); *G06F 21/78* (2013.01)

(56) References Cited

U.S. PATENT DOCUMENTS

| | | |
|---|---|---|
| 9,542,344 B2 | 1/2017 | Tuers et al. |
| 9,760,502 B2 | 9/2017 | Raam |
| 9,905,314 B2 | 2/2018 | Tuers et al. |
| 2010/0005478 A1* | 1/2010 | Helfman ................. H04L 67/63 |
| | | 719/315 |
| 2012/0137139 A1 | 5/2012 | Kudoh et al. |
| 2015/0293858 A1* | 10/2015 | Raam ...................... G06F 21/78 |
| | | 713/193 |
| 2017/0045927 A1* | 2/2017 | Bahgsorkhi ......... G06F 11/3013 |

OTHER PUBLICATIONS

Lee et al., "FESSD: A Fast Encrypted SSD Employing On-Chip Access-Control Memory", Journal of Latex Class Files, (2007), vol. 6, No. 1, pp. 1-4.

* cited by examiner

JUST-IN-TIME POST-PROCESSING COMPUTATION CAPABILITIES FOR ENCRYPTED DATA

BACKGROUND

Field

This disclosure is generally related to electronic devices and more particularly to storage devices.

Background

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. Control tables are used to track the physical location of logical sectors, or blocks, in the flash memory. The control tables are stored in the non-volatile memory to enable access to the stored data after a power cycle.

In the flash storage device, data that is decoded and decrypted may be referred to as "clear." However, data is typically encrypted and encoded when stored in flash memory and, therefore, may not be in the clear. When the flash storage device reads data from a cell of the flash memory, e.g., from a memory location such as a block, the data may be in the clear only at the last moment—that is, the data may be both decoded and decrypted only as the data is accessed from the flash storage device. As "non-clear" data or "unclear" data (e.g., encoded and/or encrypted data) may be unavailable for processing and/or other operations, there may be no point at which the data can be processed or otherwise operated upon in the flash storage device. For example, no clear data hooks may exist for a processor to act on the data after the data has been decoded and as the data is decrypted at the flash storage device. Therefore, a need exists for techniques and solutions to locally provide clear data at a flash storage device for post-processing and/or other operations. The benefits of techniques and solutions may be further realized by avoidance of interference to other components, such as a fast path accelerator, interface, and/or other similar hardware.

SUMMARY

In one aspect of the present disclosure, a first storage apparatus is disclosed. The first storage device includes a memory and an encryption core. The encryption core may be configured to retrieve encrypted data from the memory, decrypt the encrypted data, and provide a post-processing result based on the decrypted data when the decrypted data is associated with a post-processing tag.

In another aspect of the present disclosure, a second storage apparatus is disclosed. The second storage device includes a memory and an encryption core. The encryption core may be configured to identify a post-processing tag associated with encrypted data retrieved from the memory, decrypt the encrypted data, and provide a post-processing result associated with the post-processing tag based on the decrypted data.

In a further aspect of the present disclosure, a third storage apparatus is disclosed. The third storage device includes a memory and an encryption core. The encryption core may be configured to retrieve encrypted data from the memory, decrypt the encrypted data, determine whether the decrypted data is associated with a post-processing tag, and post-process the decrypted data when the decrypted data is associated with the post-processing tag.

It is understood that other aspects of the storage device and method will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
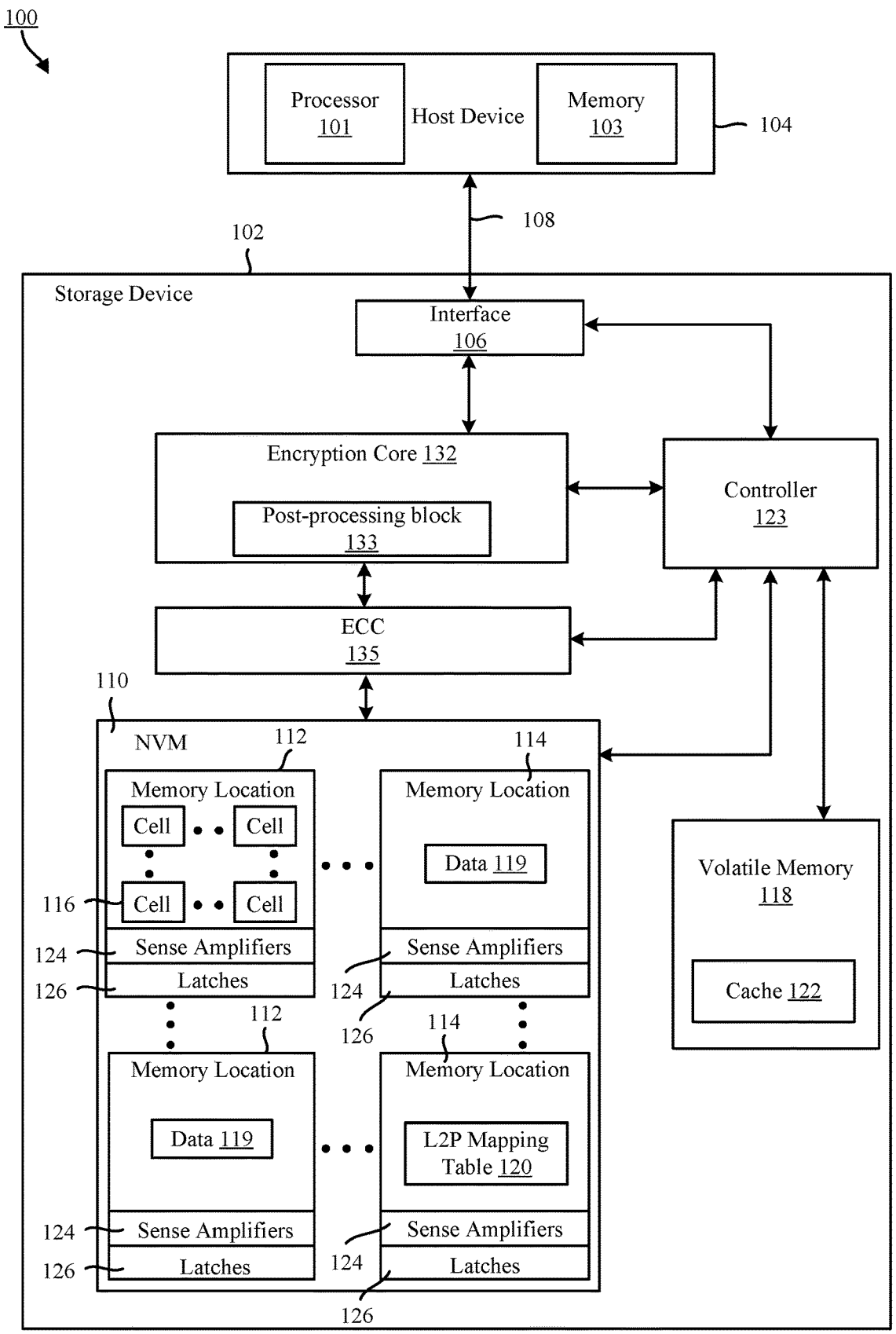
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

In the following detailed description, various aspects of a storage device in communication with a host device will be presented. These aspects are well suited for flash storage devices, such as solid-state drives (SSDs) and/or secure digital (SD) cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

When a storage device receives data (e.g., via a write instruction), the storage device may securely store the data. In particular, the storage device may encode and/or encrypt the data. Accordingly, the data may be unreadable on the storage device and, therefore, operations performed using the data may be limited or eliminated. Generally, when the data is read from the storage device, such as when a host device issues a read instruction, the data may be retrieved and may be decrypted only immediately prior to delivery to the host device.

To improve storage device performance, the present disclosure provides for a storage device that is configured to maintain secure storage while also allowing one or more operations to be performed with the data when requested or instructed by a host device. Specifically, the storage device may include an encryption core, such as an Advanced Encryption Standard (AES) core, which may be configured to decrypt data. Further, the encryption core may be configured to perform one or more post-processing operations on the data once the data is decrypted. Examples of such post-processing operations may include various functions and/or algorithms that accept the data as an input, such as data reduction, data compression, data formatting, and/or data querying. The encryption core may then provide a post-processing result to the host device based on the one or more post-processing operations.

In order for the encryption core to be informed of data subject to a post-processing operation, the data may be tagged when encrypted. The tag may indicate which data is subject to which post-processing operation. Thus, when the encryption core decrypts tagged data, the encryption core may be aware of the post-processing operation that is to be performed upon the data.

Potentially, the host device may indicate which data is to be tagged. For example, when the host device issues an instruction to execute a certain post-processing operation on specific data, the instruction may indicate that the encrypted data is to be tagged according to the post-processing operation included in the instruction. The tag may then be stored, e.g., in volatile or non-volatile memory.

FIG. 1 shows an exemplary block diagram 100 of a storage device 102 which communicates with a host device 104 (also referred to as a "host") according to an exemplary embodiment. The host device 104 and the storage device 102 may form a system, such as a computer system (e.g., server, desktop, mobile/laptop, tablet, smartphone, etc.). The components of FIG. 1 may or may not be physically co-located. In this regard, the host device 104 may be located remotely from storage device 102. Although FIG. 1 illustrates that the host device 104 is shown separate from the storage device 102, the host device 104 in other embodiments may be integrated into the storage device 102, in whole or in part. Alternatively, the host device 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host device 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host device 104 using, for example, cellular communication (e.g., 5G NR, 4G LTE, 3G, 2G, GSM/UMTS, CDMA One/CDMA2000, etc.), wireless distribution methods through access points (e.g., IEEE 802.11, WiFi, HiperLAN, etc.), Infrared (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

As shown in the exemplary embodiment of FIG. 1, the storage device 102 includes non-volatile memory (NVM) 110 for non-volatilely storing data received from the host device 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the illustrated exemplary embodiment of FIG. 1, each memory location 112 may be a block 114 including multiple cells 116. The cells 116 may be single-level cells, multi-level cells, triple-level cells, quad-level cells, and/or penta-level cells, for example. Other examples of memory locations 112 are possible; for instance, each memory location may be a die containing multiple blocks. Moreover, each memory location may include one or more blocks in a 3-D NAND array. Moreover, the illustrated memory locations 112 may be logical blocks which are mapped to one or more physical blocks.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g., NVM 110) is configured to store data 119 received from the host device 104. This data 119 may also be referred to as "host data" and may be differentiated from non-host data (e.g., metadata) that includes, inter alia, log files, error reports, and other such data. Non-host data is generally not intended to be written and read by the host device 104; rather, non-host data may be generated and stored in connection with managing and transferring host data.

The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host device 104 to physical addresses in the NVM 110 indicating the location(s) where each of the data is stored. This mapping may be performed by the controller 123 of the storage device 102. The L2P mapping table 120 may be a table or other data structure which includes an identifier such as a logical block address (LBA) associated with each memory location 112 in the NVM 110 where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
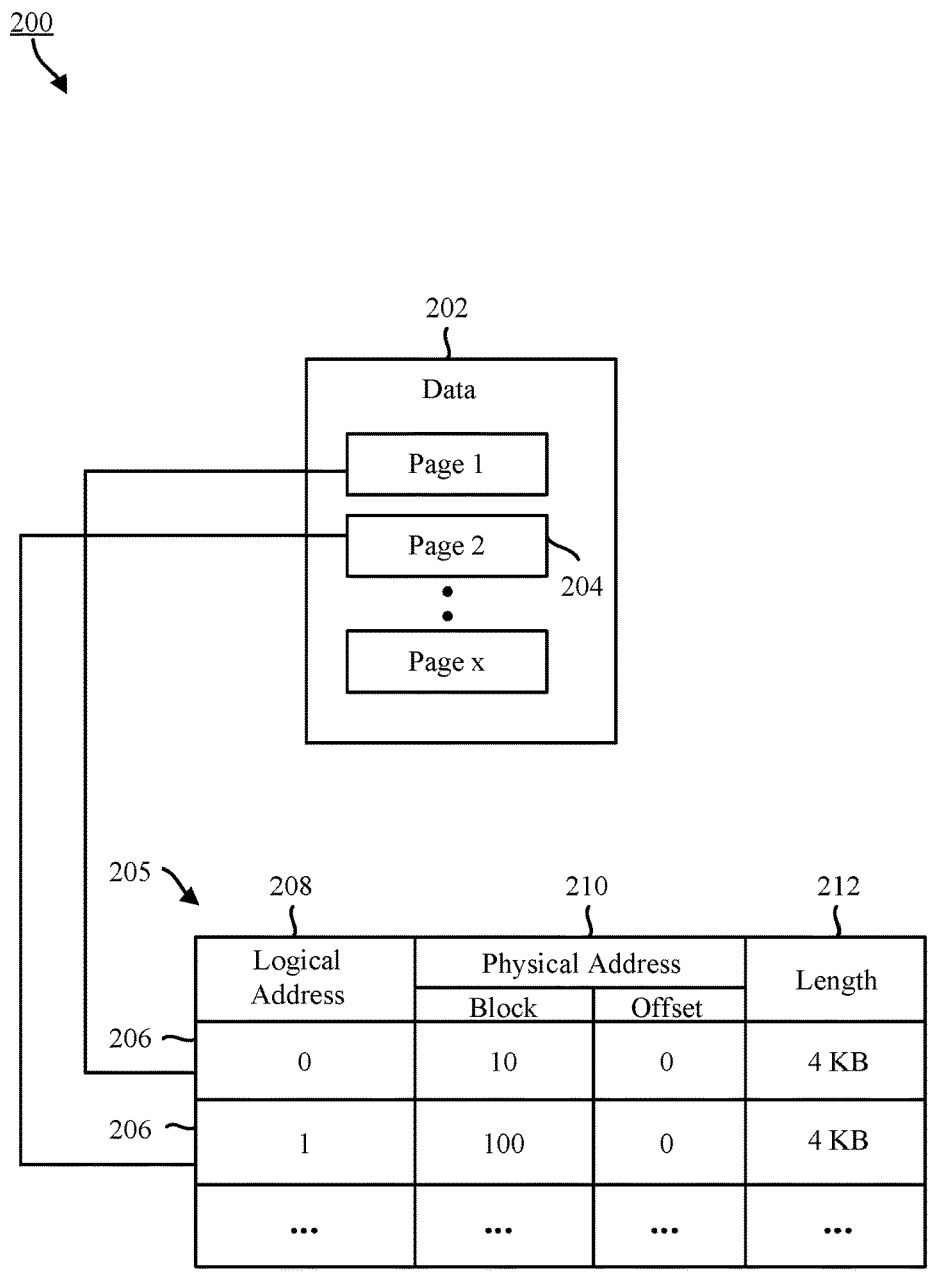
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g., 4 KB or some other size).

Referring back to FIG. 1, the volatile memory 118 also stores a cache 122 for the storage device 102. The cache 122 includes entries showing the mapping of logical addresses specified for data requested by the host device 104 to physical addresses in NVM 110 indicating the location(s) where the data is stored. This mapping may be performed by the controller 123. When the controller 123 receives a read command or a write command for data 119, the controller 123 checks the cache 122 for the logical-to-physical mapping of each data. If a mapping is not present (e.g., it is the first request for the data), the controller 123 accesses the L2P mapping table 120 and stores the mapping in the cache 122. When the controller 123 executes the read command or write command, the controller accesses the mapping from the cache and reads the data from or writes the data to the NVM 110 at the specified physical address. The cache 122 may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g., readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry, and/or any combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g., translate the logical addresses into physical addresses), and access or store data in the cells 116 located at the mapped physical addresses.

The controller 123 and its components may be implemented with embedded software that performs the various functions of the controller 123 described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The storage device 102, however, may be configured to securely store data in memory. Therefore, the storage device 102 may further include an encryption core 132. The encryption core 132 may be a reusable unit of logic, a cell, an ASIC, an FPGA, hard-wired logic, analog circuitry, and/or any combination thereof. In some embodiments, some or all of the functionality described with respect to the controller 123 may be implemented by the encryption core 132.

The encryption core 132 may be configured to encrypt the data received through the interface 106. For example, the encryption core 132 may encrypt the data according to AES. Furthermore, the encryption core 132 may provide a secure location for decrypted data. With the storage device 102, for example, the encryption core 132 may effect a firewall, outside of which decrypted data remains inaccessible.

The controller 123 may provide the data 119 received through the interface 106 to the encryption core 132. In response, the encryption core 132 may encrypt the data 119. In some embodiments, the storage device 102 may further include an error correction code encoder/decoder (ECC) 135, which may be configured to control errors in the data 119. For example, the ECC 135 may encode the (encrypted) data 119 with redundant information that may be used to detect and correct errors occurring in the data 119. The ECC 135 may be implemented as hardware, software, firmware, and/or any combination thereof.

Once encrypted, the controller 123 may provide the data 119 to the ECC 135 for encoding. The controller 123 may then store the encrypted and encoded data 119 in the memory location 112.

The host device 104 may retrieve data from the storage device 102 by sending a read command specifying one or more logical addresses associated with the data to be retrieved from the storage device 102, as well as a length of the data to be read. The interface 106 receives the read command, and the controller 123 (and/or encryption core 132) accesses the L2P mapping in the cache 122 or otherwise the NVM to translate the logical addresses specified in the read command to the physical addresses indicating the location of the data. The controller 123 (and/or encryption core 132) then reads the requested data from the memory location 112 specified by the physical addresses by sensing the data using the sense amplifiers 124 and storing them in data latches 126 until the read data is returned to the host device 104 via the host interface 106.

Prior to providing the data to the host device 104 via the host interface 106, however, the data should be in the clear—that is, the data should be both decoded and decrypted. Thus, the controller 123 (and/or encryption core 132) may provide the encoded and encrypted data first to the ECC 135, which may decode the data by detecting and correcting any errors in the data. For example, the ECC 135 may decode data using redundancy bits, which were earlier inserted when the data was encoded. In so doing, the ECC 135 may interpret, reduce, and/or remove at least one set of redundancy bits present within the encoded data.

In some embodiments, the controller 123 may provide the (decoded) data to the encryption core 132. Alternatively or additionally, the encryption core 132 may retrieve the data, for example, from the NVM 110 and into the ECC 135 before obtaining the decoded data from the ECC 135. The encryption core 132 may decrypt the data, e.g., using AES decryption. The decoded and decrypted data, which may also be referred to as "clear" data, may then be returned to the host device 104 via the host interface 106. This data returned to the host device 104 may be raw data—for example, decoded and decrypted data returned to the host device 104 in response to a read command may be raw data that is equal to that stored in the storage device 102 pursuant to a write command earlier issued by the host device 104.

In some instances, rather than providing raw data to the host device 104, it may be desirable for data to undergo some post-processing in advance of delivery to the host device 104. Thus, when reading from the storage device 102, the host device 104 may issue a command or instruction requesting the result(s) of performing or executing some post-processing operation(s) with some data. Illustratively, the host device 104 may issue a read command the identifies one or more logical addresses (e.g., a range of LBAs, a length of the one or more logical addresses, etc.) associated with the data to be read from the storage device 102 and, further, identifies a post-processing operation(s) to be applied to the data associated with the one or more logical addresses.

Effectively, the read command may request the result(s) of one or more post-processing operations on the data associated with a set of defined logical addresses, such as the result(s) of conversion, compression, reduction, formatting, and/or querying on the data. Responsive to such a read command, the storage device 102 may return the requested result(s) of the one or more post-processing operation(s) on the data associated with the set of logical addresses defined in the read command. In contrast to providing a result of a post-processing operation on data, the storage device 102 may provide raw data in response to a conventional read command, which may similarly identify one or more logical addresses (e.g., a range of LBAs, a length of the one or more logical addresses, etc.) associated with the data to be read from the storage device 102.

The foregoing illustrations provide a non-exhaustive list of post-processing operations, and other post-processing operations are contemplated herein without departing from the scope of the present disclosure. Effectively, a result of a post-processing operation may be any data that is different from (e.g., unequal to) the raw data.

By way of illustration, the data 119 may be a text document, and the host device 104 may send a command instructing the storage device 102 to return the result(s) of post-processing operation(s) to remove all white space from the text document, to convert all letters in the text document to upper case, to remove all commas from the text document, and/or to otherwise change some font or format of the text document. As another illustration, the host device 104 may request a result of a post-processing operation in which the data 119 is queried, such as a result of querying the count of the number of occurrences of a specific character or string in the data 119.

In contrast to a conventional read command that lacks a tag, a read command associated with post-processing of data may include a tag (e.g., a post-processing tag) that indicates a post-processing operation is to be applied to the data identified by the read command. When the host device 104 provides such a read command to the storage device 102, the data may be tagged for post-processing, although the data is non-clear (e.g., encoded and encrypted) at the time of receiving the read command from the host device 104.

The tag may be stored, for example, in association with non-clear data. Potentially, the controller 123 and/or the encryption core 132 may identify the tag when a read command is received from the host device 104, and then may store the tag. For example, the tag may be stored in an L2P mapping table that includes a mapping of logical addresses earlier specified for the data, e.g., when the data was written from the host device 104 to physical addresses in the NVM 110.

In some embodiments, the tag may be stored in NVM 110, such as in the L2P mapping table 120 associating the data 119 with one or more logical addresses. In some other embodiments, the tag may be stored in volatile memory 118, such as in the cache 122 or other buffer. Though potentially, the tag may not be stored in NVM 110 (e.g., the tag may not be stored in the NAND).

In order to implement various post-processing operations, the encryption core 132 may include a post-processing block 133. As will be further described below, the post-processing block 133 may be differently implemented according to different aspects. In particular, the post-processing block 133 may be autonomous (e.g., so that all operations are locally performed within the encryption core 132), or the post-processing block 133 may interface with at least one remote system (e.g., a trusted host device, a trusted resource accessible over a network, etc.).

Notwithstanding the implementation of the post-processing block 133, the data used therein should be in the clear—that is, data used by the post-processing block 133 should be both decoded and decrypted. Non-clear data may cause inaccurate and/or corrupted results when provided to the post-processing block 133, as the bits of non-clear data do not accurately correspond with the bits of the raw data when in the clear. Thus, while data may be initially tagged when still encoded and encrypted (e.g., stored in NVM 110), the post-processing operation(s) corresponding to the tagging may remain unexecuted until the data has traversed the ECC 135 and the encryption core 132.

Accordingly, the post-processing block 133 may be included within the encryption core 132, thereby maintaining data security and integrity within the storage device 102. Specifically, the post-processing block 133 may use clear data while the encryption core 132 protects the security and integrity of that data. Such a configuration may prevent circumvention of security mechanisms through calls to a post-processing block outside the encryption core 132, as well as provide security and/or confidentiality mechanisms for the post-processing block 133 itself—e.g., a firewall of the encryption core 132 may protect the post-processing block 133 from unauthorized debugging, decompiling, exposing of source code, etc.

According to one configuration, the post-processing block 133 may include requisite functionality for executing at least one post-processing operation using some data in the storage device 102 and, further, for returning at least one result derived from the execution of the at least one post-processing operation. For example, the post-processing block 133 may include logic and/or instructions configured to: (1) receive data identified by a read command received from the host device 104 (e.g., data corresponding to a range of LBAs indicated by the read command), (2) execute a function, algorithm, instruction set, etc. that takes the data as at least one input, argument, parameter, domain, etc., and (3) responsively provide at least one result of the execution, which may be at least one output, answer, return, codomain, etc. The post-processing block 133 may implement such logic and/or instructions via a hook, library, (reserved) memory location, engine, and/or module within the encryption core 132.

In some embodiments, the storage device 102 may be configured with a separate (e.g., dedicated) processor for the post-processing block 133. For example, a first processor may be configured for the encryption core 132, whereas a separate, second processor may be configured for the post-processing block 133. In such embodiments, the encryption core 132 may be configured to generate and signal information indicating that data in the encryption core 132 is in the clear (e.g., decoding and decrypting of the data has been fully completed). Similarly, the post-processing block 133 may be configured to generate and signal information indicating the data is no longer in use for post-processing operations (e.g., the data may not be free until the post-processing block 133 is completely finished with it, such as when a result is obtained). By respectively signaling such information, the encryption core 132 and the post-processing block 133 may prevent the data from being simultaneously accessed, e.g., by competing functions, modules, etc. Additionally, signaling information indicating the status of the data (e.g., whether the data is currently in use) may allow for buffer arbitration. Furthermore, the encryption core 132 (e.g., first processor) may be configured to generate and signal information indicating the data is being transferred to the host device 104, and the post-processing block 133 may recycle its buffers in response to such information.

In the context of the aforementioned tag, data retrieved from NVM 110 may be directed to the post-processing block 133 when associated with a tag. That is, a tag associated with data may indicate that the data is to be used in the post-processing block 133. In particular, when the host device 104 issues a read command for data and the read command includes a tag for the data, then the data may be fetched into the post-processing block 133 following decoding by the ECC 135 and decryption by the encryption core 132.

In some embodiments, the post-processing block 133 may be configured to execute a plurality of post-processing operations, rather than just a single post-processing operation. Illustratively, the post-processing block 133 may perform at least two of conversion, compression, reduction, formatting, and/or querying using data retrieved from NVM 110 responsive to a read command. Thus, the post-processing block 133 may include a plurality of hooks, libraries, (reserved) memory locations, engines, and/or modules, each of which may be respectively configured to perform a different post-processing operation. For example, the post-processing block 133 may include one hook that uses retrieved data to return a result of compressed data, and may also include another hook that uses retrieved data to return a result of a query for the number of times a preconfigured string occurs within the retrieved data.

A tag may be used to identify which of the post-processing operations available through the post-processing block 133 is to be executed. For example, when encrypted data is fetched to the encryption core 132, the encryption core 132 may identify the tag and select a corresponding post-processing operation from a plurality of post-processing operations available through the post-processing block 133. Accordingly, the encryption core 132 may provide the data to a section (e.g., hook, logic, library, engine, module, etc.) of the post-processing block 133 at which the post-processing operation corresponding to the tag may be executed.

Potentially, data may be associated with multiple tags. That is, a read command may include more than one tag when issued to retrieve data from the storage device 102. Accordingly, each post-processing operation respectively corresponding to each of tags included in the read command may be executed when the retrieved data is decrypted by the encryption core 132. As each post-processing operation may return a result based on a respective execution using an instance (e.g., copy) of the clear data, the post-processing block 133 may store a plurality of results, each of the results having been respectfully returned through execution of one of the post-processing operations corresponding to one of the tags included in the read command.

Figure 3:
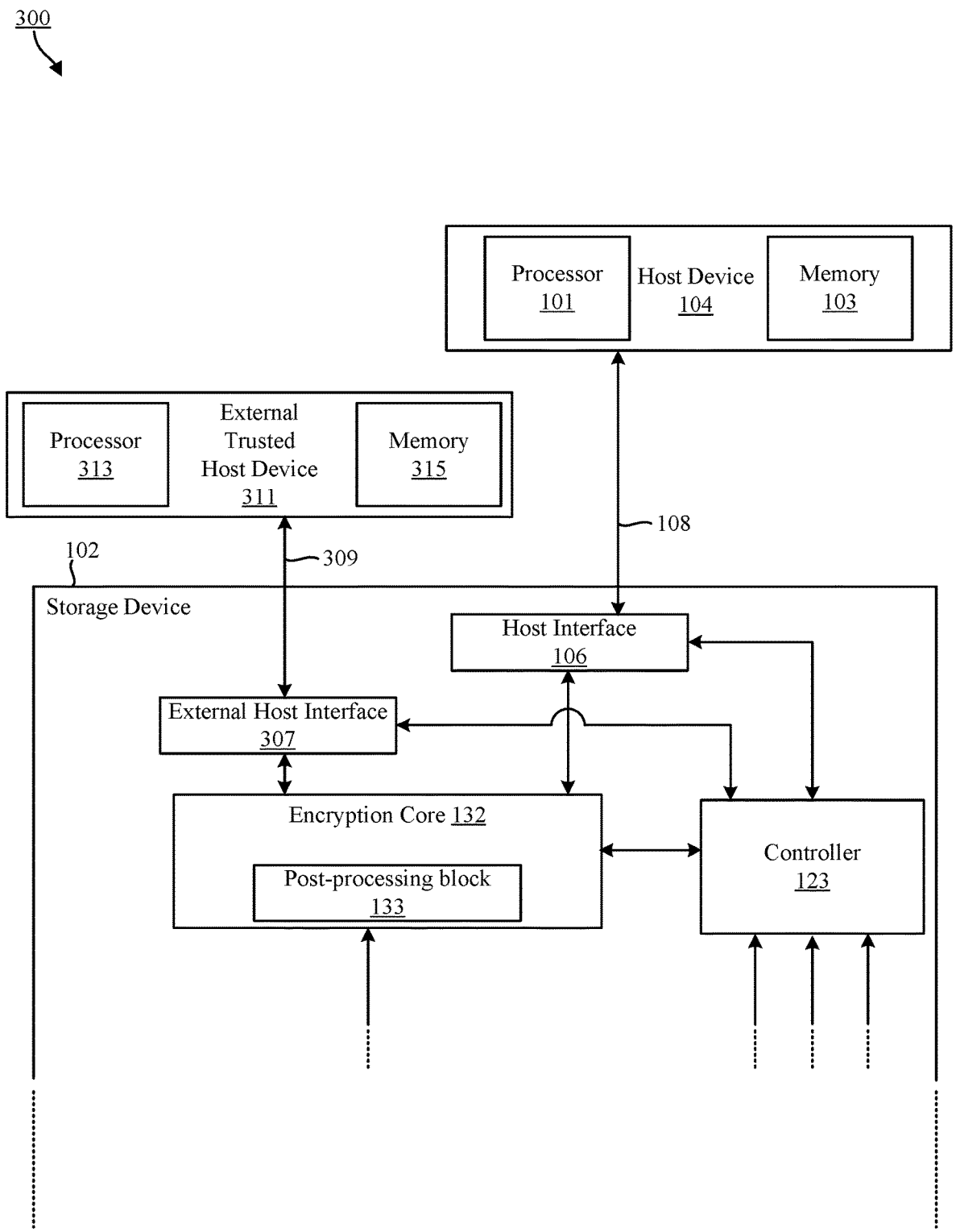
FIG. 3 is a block diagram illustrating an exemplary embodiment of the storage device of FIG. 1 in communication with an external trusted host device, in addition to the host device.

According to another configuration, the post-processing block 133 may provide a secure location for a trusted host device to access data for at least one post-processing operation. FIG. 3 illustrates a block diagram 300 of the storage device 102 in communication with the host device 104, as well as an external trusted host device 311 (also referred to as an "external trusted host"). The external trusted host 311 may include any computing device, including, for example, a computer server, a NAS unit, a desktop computer, a notebook (e.g., laptop) computer, a tablet computer, a mobile computing device such as a smartphone, a television, a camera, a display device, a digital media player, a video gaming console, a video streaming device, a network or Internet resource (e.g., a uniform resource locator or uniform resource identifier), or the like.

The external trusted host 311 may include at least one processor 313 and a memory 315. The at least one processor 313 may include any form of hardware capable of processing data and may include a general purpose processing unit (such as a CPU), dedicated hardware (such as an ASIC), DSP, configurable hardware (such as a FPGA), or any other form of processing unit configured by way of software instructions, firmware, or the like.

The memory 315 of the external trusted host 311 may be used by the external trusted host 311 to store data or instructions processed by the external trusted host 311 or data received from the storage device 102. In some examples, the memory 315 may include non-volatile memory, such as magnetic memory devices, optical memory devices, holographic memory devices, flash memory devices (e.g., NAND or NOR), PCM devices, ReRAM devices, MRAM devices, F-RAM, and/or any other type of non-volatile memory devices. In other examples, the memory 315 of the external trusted host 311 may include volatile memory, such as RAM, DRAM, SRAM, and/or SDRAM (e.g., DDR1, DDR2, DDR3, DDR3L, LPDDR3, DDR4, and the like). The memory 315 may also include both non-volatile memory and volatile memory, whether integrated together or as discrete units.

The external trusted host 311 may interface with the storage device 102 over a bus/network 309 via an external host interface 307. The bus/network 309 may be, for example, Ethernet or WiFi, or a bus standard such as SATA, PCIe, SCSI, or SAS, among other possible candidates. According to various other embodiments, the bus/network 309 may include a wired and/or wireless network, and so the external trusted host 311 may communicate with the storage device 102 through the external host interface 307 using, for example, cellular communication (e.g., 5G NR, 4G LTE, 3G, 2G, GSM/UMTS, CDMA One/CDMA2000, etc.), wireless distribution methods through access points (e.g., IEEE 802.11, WiFi, HiperLAN, etc.), IR, Bluetooth, Zigbee, or other WWAN, WLAN, WPAN technology, or comparable wide area, local area, and personal area network technologies.

As the external trusted host 311 may be "trusted" by the storage device 102 (and specifically, by the encryption core 132), the external trusted host 311 may be authenticated and the connection over the bus/network 309 may be secure. In some embodiments, the controller 123 may perform a "handshake" procedure with the external trusted host 311 via the external host interface 307, during which the identity and/or trustworthiness of the external trusted host 311 is verified by the controller 123 and/or encryption core 132. According to one example, the external trusted host 311 may provide a signature or key to the storage device 102, which may be authenticated by the encryption core 132 using a private key or other cryptographic hash function. According to another example, the external trusted host 311 may provide a digital certificate that authenticates the identity and/or security of the external trusted host 311 (e.g., via a trusted third party and/or authentication organization), and the encryption core 132 may verify and/or authenticate the external trusted host 311 using the digital certificate.

As described above, a read command may include a tag, and when the data identified by the read command is retrieved from NVM 110, the encryption core 132 may provide the clear data to the post-processing block 133 in accordance with the tag. Differently from the autonomous configuration of the post-processing block 133, however, the external trusted host 311 may provide at least one of the post-processing operations corresponding to a tag included in the read command. For example, the external trusted host 311 may include the hooks, libraries, engines, modules, etc. that return the results of post-processing operations using retrieved data.

In some embodiments, clear data may be sent over the bus/network 309 to the external trusted host 311 via the external host interface 307, and the external trusted host 311 may execute a post-processing operation corresponding to the tag. Subsequently, the external trusted host 311 may send the result of the post-processing operation over the bus/network 309 to the post-processing block 133 via the external host interface 307. Thus, when the data is in the clear on the storage device 102, the data may remain securely within the encryption core 132, e.g., protected by a firewall.

In some other embodiments, the external trusted host 311 may execute a post-processing within a memory location of the post-processing block 133. For example, the post-processing block 133 may serve as on-drive RAM that is accessible by the external trusted host 311 over the bus/network 309 via the external host interface 307. When the encryption core 132 deposits clear data in the memory location of the post-processing block 133, the external trusted host 311 may be informed of the availability of the clear data for the post-processing operation provided by the external trusted host 311.

In response, the external trusted host 311 may execute the post-processing operation using the clear data deposited in the memory location of the post-processing block 133, although the clear data may remain on the storage device 102 within the portion secured by the encryption core 132. In effect, the external trusted host 311 may use the post-processing block 133 as memory to retain the clear data as the external trusted host 311 executes the post-processing operation with the clear data. Subsequently, the external trusted host 311 may continue using the post-processing block 133 to store the result of the post-processing operation.

Upon completion of the post-processing operation, the post-processing block 133 may return a result, which may be the output of a function, algorithm, or the like, as described above. The result may be different from the raw data identified by the read command that included the tag corresponding to the post-processing operation executed via the post-processing block 133. The result may be immediately and/or temporarily stored within the encryption core 132 (e.g., the result may be stored in a buffer and/or cache of the encryption core 132), and therefore, may be secure within the storage device 102. Responsive to the read command received from the host device 104, the encryption core 132 and/or the controller 123 may return the result to the host device 104 over the bus/network 108 via the host interface 106.

Importantly, the post-processing block 133 is avoided when data is conventionally read from the storage device 102. That is, the configuration of the storage device 102 with a post-processing block 133 does not introduce any additional overhead to the process of returning raw data to the host device 104 in response to a read command. Therefore, the host device 104 may use the storage device 102 to write and read raw data at approximately the same speed regardless of whether the storage device 102 is configured with the post-processing block 133.

Additional overhead in reading raw data, such as latency and/or instruction execution, may be avoided by the storage device 102 through the tagging procedure. Tags are absent from read commands for raw data, and therefore, the post-processing block 133 is circumvented when data is fetched from the NVM 110 through the ECC 135 and the encryption core 132. For example, the absence of a tag from a read command may prevent any instructions for a hook, library, or the like from being pushed onto an instruction stack, because the process of retrieving, decoding, and decrypting the data would not branch into the post-processing block 133 according to a tag stored for the data. Therefore, additional functionality implemented via the post-processing block 133 may be introduced in the storage device 102 with little to no impact on existing performance.

According to some embodiments, a tag may be flushed from volatile memory 118 to NVM 110 in order to reduce overall resource (e.g., memory) consumption within the storage device 102. However, the storage device 102 may be configured to flush a tag only after the corresponding post-processing operation is completed. For example, a post-processing operation may be completed, and the post-processing block 133 may signal information indicating the completion, once a result is obtained from execution of a post-processing operation using the data and the result is stored in memory and/or delivered to the host device 104. Upon receiving such information indicating the completion, the tag corresponding to the completed post-processing operation may be flushed, e.g., by the controller 123 from volatile memory 118 or NVM 110.

While tags may be flushed at some point in time, the storage device 102 may be configured with some failsafe mechanisms to prevent interruptions, such as interruptions caused by loss of power to the storage device 102. Specifically, the storage device 102 may be configured to store a state of post-processing at one or more points in order to substantially recover from an interruption to a post-processing operation.

The state of a post-processing operation may be reflected in some non-host data (e.g., metadata), which may be stored in volatile memory 118. The non-host data may include one or more tags, which may be stored in volatile memory 118 and/or an L2P mapping table before being flushed based upon completion of the corresponding post-processing operation(s). Thus, a tag stored in volatile memory 118 may be assumed to be associated with an incomplete post-processing operation, and so remains relevant in order to accurately respond to the read command.

Generally, such non-host data is in the clear and is not stored in non-volatile memory, such as NVM 110. However, the non-host data in volatile memory 118 may be saved in a memory location from which the non-host data is recoverable over a power cycle; that is, the non-host data may be accessible and valid upon returning from a power loss event. In the context of post-processing operations, the storage device 102 (e.g., the encryption core 132 and/or the post-processing block 133) may be configured to recover a state of execution of a post-processing operation, e.g., in response to a power loss event, such as the initiation of a power cycle.

The state of execution of a post-processing operation may include the identification of a tag included in a read command based upon which some encrypted data is retrieved from NVM 110. In other words, recovery of the state of execution of a post-processing operation may include identification of a tag associated with data that has not yet been returned to the host device 104 based on a read command. In some aspects, the exact point in execution of a post-processing operation may not necessarily be recoverable, but the tag included in an incomplete read command may still be recoverable so that the corresponding post-processing operation is still able to be executed using the data associated with the incomplete read command before the storage device 102 returns anything to the host device 104.

In some embodiments, the storage device 102 may include some static column RAM (SCRAM) and/or similar memory. The storage device 102 (e.g., the controller 123) may be configured to save the non-host data across the SCRAM and/or NAND upon detection of a power loss of a power cycle. Upon completion of the power cycle, at which point power may be restored to the storage device 102, the non-host data may be recovered, e.g., using the SCRAM and/or NAND. For example, the non-host data may be restored into memory locations so that the non-host data may be accessible for resumption of various operations.

Illustratively, the tags included in incomplete read commands may be restored so that such tags are accessible by the encryption core 132, and so the encryption core 132 may deliver decrypted data to the post-processing block 133 according to the tag included in the corresponding read command. The post-processing block 133 may then identify the post-processing operation corresponding to the tag, and execute the corresponding post-processing operation using the decrypted data as the storage device 102 completes the power cycle.

According to some embodiments, the storage device 102 may be configured with a fast path accelerator that expedites responsiveness to read commands received from the host device 104. For example, when a read command is received from the host device 104 that indicates data to be read from the NVM 110, fast path acceleration may allow the host data indicated by the read command to be directly accessed—i.e., direct memory access (DMA)—from the NVM 110 through the ECC 135 and the encryption core 132, e.g., while avoiding the controller 123 (as well as any other processors). In so doing, host data may be returned to the host device 104 with a substantive increase in speed.

The storage device 102, however, may refrain from using fast path acceleration on non-host data (e.g., metadata), e.g., as DMA of non-host data provides little, if any, appreciable benefit in terms of performance and security. Thus, the storage device 102 may be configured to separate host data from non-host data, and therefore, the storage device 102 may schedule host data for DMA, but refrain from scheduling non-host data.

With the inclusion of the post-processing block 133, however, "host data" may include both raw data retrieved from NVM 110 according to a read command and the result of a post-processing operation using clear data retrieved from NVM 110 according to a read command that includes a tag. By configuring the post-processing block 133 within the encryption core 132, the effect of "host data" encompassing both raw data and post-processing results may be reduced, or even minimized, in scheduling host data for fast path acceleration. As the host data may be consistent across all types of read commands (e.g., read commands both including and lacking a tag) between retrieval from the NVM 110 and decryption in the encryption core 132, host data may be consistently identified as that data corresponding to the logical addresses and lengths included in read commands for DMA between the NVM 110 and the encryption core 132.

In some embodiments, the encryption core 132 may include a buffer or cache configured to store decoded and decrypted data that is to be used in the post-processing block 133. In contrast, decoded and decrypted data that is to be delivered to the host device 104 as raw data may be sent over the bus/network 108 via the host interface 106, e.g., according to a fast path acceleration schedule. For example, the encryption core 132 may separate post-processing data into the buffer or cache, while raw data may continue to the host device 104 over the bus/network 108. Post-processing data in the buffer or cache may then be used in the post-processing block 133 based on the tag included in the read command associated therewith. Subsequently, the result of the post-processing block 133 using the post-processing data may be delivered to the host device 104. Separation of the host data at this later stage of fast path acceleration (e.g., by means of a switch) may reduce the effect of such separation on scheduling of the fast path acceleration.

Figure 4:
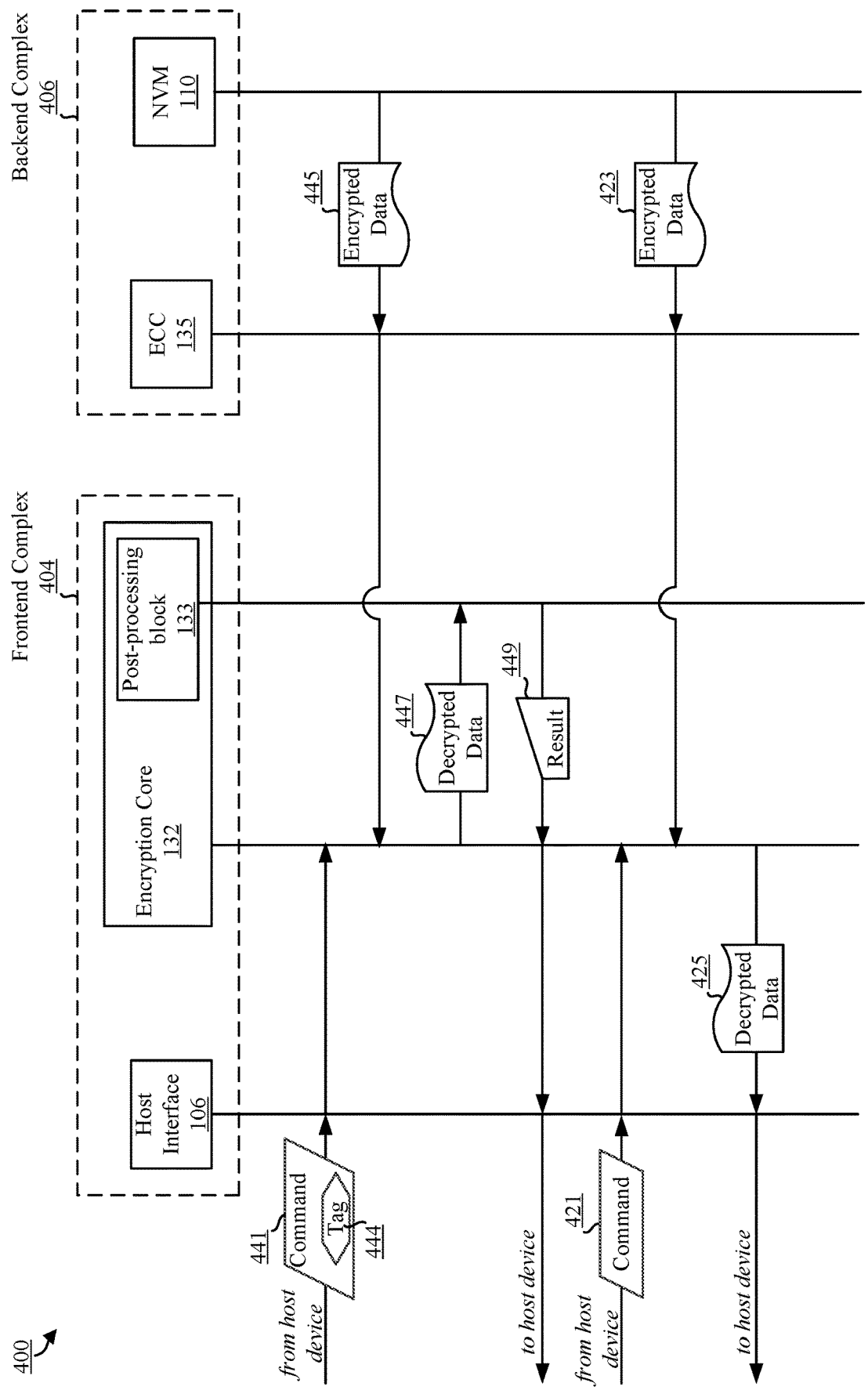
FIG. 4 is a call flow diagram illustrating an exemplary operations and data flow in the storage device of FIG. 1.

Referring to FIG. 4, a call flow diagram 400 illustrates an exemplary flow of operations in the storage device 102 of FIG. 1. The flow of operations may include the transfer of data from a backend complex 406, in which the data is non-clear, through a frontend complex 404, at which point the data is in the clear. The backend complex 406 includes, inter alia, the NVM 110 in which the data is stored and the ECC 135 in which the data is decoded but remains encrypted. The frontend complex 404 includes the encryption core 132 in which the data is decrypted, and so is in the clear, as well as the host interface 106 via which the clear data is transferred to the host device 104. The frontend complex 404 further includes the post-processing block 133 in which the clear data may be used for a post-processing operation so that a post-processing result may be returned to the host device 104.

In some embodiments, a read command 441 including a tag 444 may be received from the host device 104. The read command 441 may identify data to be retrieved from the NVM 110, such as by including a set of logical addresses and a length corresponding to the data in the NVM 110. The tag 444 may indicate the data is to be post-processed, and the result of the post-processing is to be returned to the host device 104 in response to the read command.

The read command 441 may be received through the host interface 106 and provided to the encryption core 132. The data identified in the read command 441 may be tagged based on the tag 444. For example, the tag 444 may be stored in an L2P mapping table or cache in order to indicate that the data identified by the read command 441 is to be post-processed. In some embodiments, the encryption core 132 may store the tag 444.

Responsive to the read command 441, the encrypted data 445 may be retrieved from the NVM 110. For example, the data stored according to the one or more logical addresses and/or the data stored according to one of the logical addresses and the following consecutive addresses equal to the length may be retrieved from the NVM 110 and provided to the ECC 135. According to some configurations, the encrypted data 445 may be scheduled for fast path acceleration, e.g., so that the encrypted data 445 may be retrieved via DMA.

The ECC 135 may decode the encrypted data 445. For example, the ECC 135 may use redundancy bits to detect and correct errors. Once decoded by the ECC 135, however, the encrypted data 445 may still be non-clear. Subsequently, the now-decoded encrypted data 445 may be provided to the encryption core 132. In the encryption core 132, the encrypted data 445 may be decrypted in order to obtain decrypted data 447, which is in the clear as the decrypted data 447 is both decoded and decrypted.

When the encrypted data 445 is retrieved into the encryption core 132, the tag 444 may indicate the path of the encrypted data 445 once decrypted. That is, the encryption core 132 may determine that, following decryption, the encrypted data 445 is to be provided to the post-processing block 133 according to the tag 444. Therefore, the encryption core 132 may provide the decrypted data 447 to the post-processing block 133.

Based on the tag 444, the post-processing block 133 may execute a post-processing operation using the decrypted data 447. In some embodiments, the post-processing block 133 may be configured to provide a plurality of post-processing operations, and the post-processing block 133 may select one post-processing operation to be executed based on the tag 444. In executing the post-processing operation using the decrypted data 447, the post-processing block 133 may obtain a result 449.

The result 449 may be the output of the post-processing operation having been executed with the decrypted data 447 as in input or parameter. Like the decrypted data 447, the result 449 may be in the clear. However, to the extent the result 449 is retained in the storage device 102 (e.g., the result 449 may be stored in a buffer or cache of the encryption core 132), the result 449 may be protected by the encryption core 132.

In response to the read command 441 including the tag 444, the result 449 may be transferred to the host device 104 via the host interface 106. For example, the encryption core 132 and/or the post-processing block 133 may send the result 449 over the bus/network 108 to the host device 104 via the host interface 106.

In some other embodiments, the storage device 102 may receive a read command 421 that lacks any tags from the host device 104. The read command 421 may be provided to the frontend complex 404, such as to the encryption core 132 via the host interface 106. In response to the read command 421, encrypted data 423 may be retrieved from the NVM 110. For example, the encryption core 132 and/or controller 123 may fetch the encrypted data 423 from the NVM 110 according to a set of logical addresses and a length included in the read command 421.

According to some configurations, the encrypted data 423 may be scheduled for fast path acceleration, e.g., so that the encrypted data 423 may be retrieved via DMA, and fetched from NVM 110. Still within the backend complex 406, the encrypted data 423 may be provided to the ECC 135. The ECC 135 may decode the encrypted data 423, which may detect and correct one or more errors present in the encrypted data 423, although the encrypted data 423 may be non-clear even after decoding.

The (decoded) encrypted data 423 may be provided to the encryption core 132. At the encryption core 132, the encrypted data 423 may be decrypted in order to obtain decrypted data 425. The decrypted data 425 may be raw data that is in the clear, but encryption core 132 may continue to protect the decrypted data 425 on the storage device 102.

Subsequently, the decrypted data 425 may be transferred from the encryption core 132 to the host device 104 via the host interface 106 based on the read command 421. As the read command 421 may not cause the encrypted data 423 to be tagged, the post-processing block 133 may be avoided, and so no overhead may be incurred by the post-processing block 133 in the process of providing the decrypted data 425 to the host device 104 in response to the read command 421.

Figure 5:
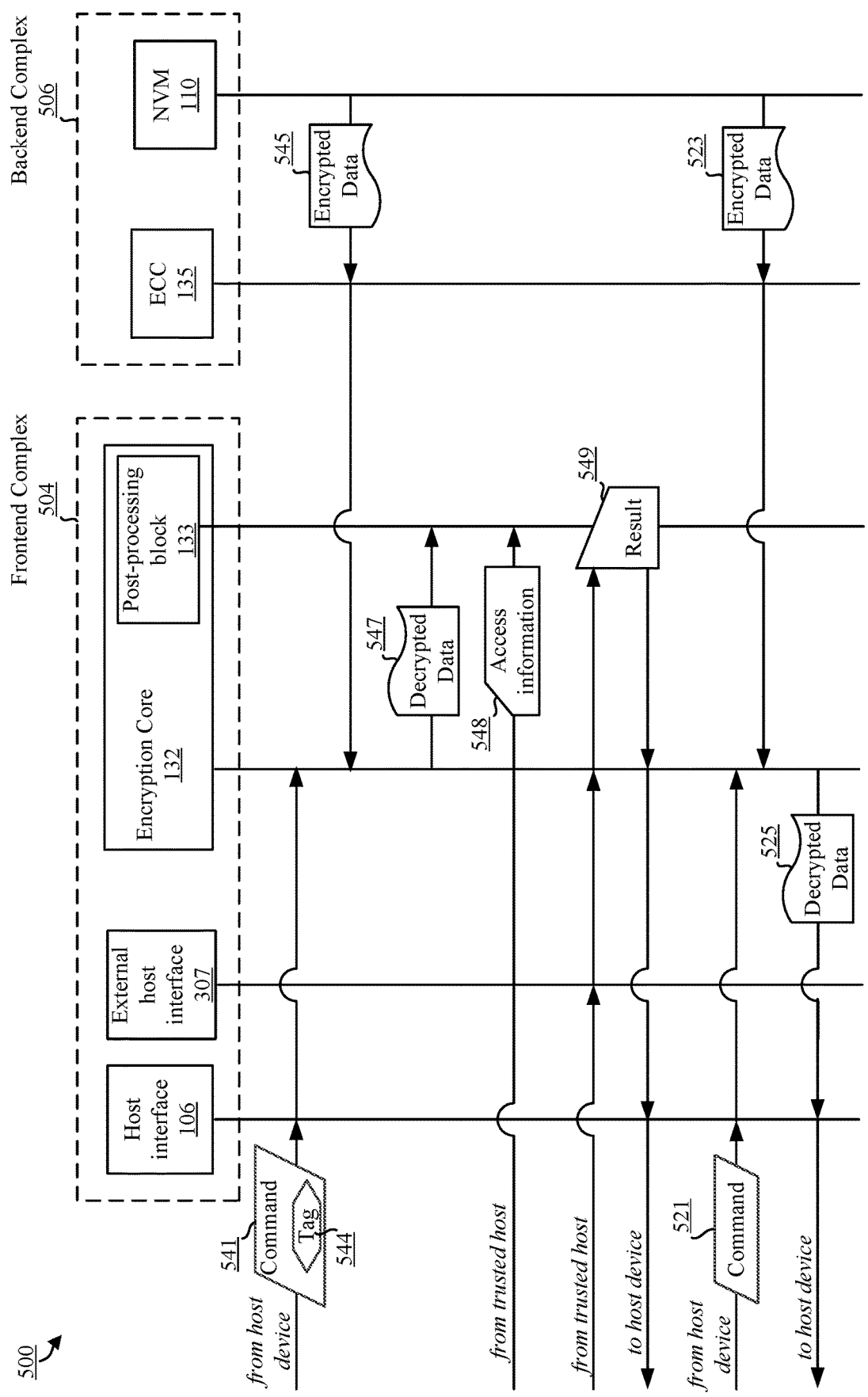
FIG. 5 is a call flow diagram illustrating an exemplary operations and data flow in the storage device of FIG. 3.

With respect to FIG. 5, a call flow diagram 500 illustrates another exemplary flow of operations in the storage device 102 of FIG. 1. The flow of operations may include the transfer of data from a backend complex 506, in which the data is non-clear, through a frontend complex 504, at which point the data is in the clear. The backend complex 506 includes, inter alia, the NVM 110 in which the data is stored and the ECC 135 in which the data is decoded but remains encrypted. The frontend complex 504 includes the encryption core 132 in which the data is decrypted, and so is in the clear, as well as the host interface 106 via which the clear data is transferred to the host device 104.

The frontend complex 504 further includes the post-processing block 133 in which the clear data may be used for a post-processing operation so that a post-processing result may be returned to the host device 104. According to FIG. 5, however, the post-processing block 133 may be configured to communicate with an external trusted host 311 to execute post-processing operations. Thus, post-processing operations executed using tagged data may be at least partially implemented using the external trusted host 311.

In some embodiments, a read command 541 including a tag 544 may be received from the host device 104. The read command 541 may identify data to be retrieved from the NVM 110, such as by including a set of logical addresses and a length corresponding to the data in the NVM 110. The tag 544 may indicate the data is to be post-processed, and the result of the post-processing is to be returned to the host device 104 in response to the read command.

The read command 541 may be received through the host interface 106 and provided to the encryption core 132. The data identified in the read command 541 may be tagged based on the tag 544. For example, the tag 544 may be stored in an L2P mapping table or cache in order to indicate that the data identified by the read command 541 is to be post-processed. In some embodiments, the encryption core 132 may store the tag 544.

Responsive to the read command 541, the encrypted data 545 may be retrieved from the NVM 110. For example, the data stored according to the one or more logical addresses and/or the data stored according to one of the logical addresses and the following consecutive addresses equal to the length may be retrieved from the NVM 110 and provided to the ECC 135. According to some configurations, the encrypted data 545 may be scheduled for fast path acceleration, e.g., so that the encrypted data 545 may be retrieved via DMA.

The ECC 135 may decode the encrypted data 545. For example, the ECC 135 may use redundancy bits to detect and correct errors. Once decoded by the ECC 135, however, the encrypted data 545 may still be non-clear. Subsequently, the now-decoded encrypted data 545 may be provided to the encryption core 132. In the encryption core 132, the encrypted data 545 may be decrypted in order to obtain decrypted data 547, which is in the clear.

When the encrypted data 545 is retrieved into the encryption core 132, the tag 544 may indicate the path of the encrypted data 545 once decrypted. That is, the encryption core 132 may determine that, following decryption, the encrypted data 545 is to be provided to the post-processing block 133 according to the tag 544. Therefore, the encryption core 132 may make the decrypted data 547 available to the post-processing block 133.

According to various embodiments illustrated by FIGS. 3 and 5, post-processing operations may be implemented via the external trusted host 311. Consequently, logic, instructions, etc. commensurate with the execution of post-processing operations may be absent from post-processing block 133. Rather, such logic, instructions, etc. may reside at the external trusted host 311, for example, as libraries, modules, engines, etc. configured to execute a post-processing operation corresponding to the tag 544 using the decrypted data 547.

In some scenarios, it may be unfeasible and/or inefficient to implement some post-processing operations on the storage device 102, such as when the post-processing operation relies on computational resources that may exceed the capabilities of the storage device 102, when the post-processing operation is proprietary and unavailable for implementation on the storage device 102, and so forth. Therefore, the external trusted host 311 may be configured with the functionality for one or more post-processing operations.

However, the storage device 102 itself may be responsible for maintaining the security of clear data, such as the decrypted data 547, by way of the encryption core 132 on the storage device 102. In order to ensure the security of clear data for which the storage device 102 may be responsible, the storage device 102 may be configured to validate and/or authenticate the external trusted host 311. In so doing, the security of clear data may be ensured even when accessed by a source separate from the storage device 102. In some embodiments, then, the storage device 102 may receive (and potentially, exchange) access information 548.

For example, the storage device 102 (e.g., the encryption core 132 and/or controller 123) may perform a "handshake" procedure with the external trusted host 311 via the external host interface 307. In some embodiments of such a handshake procedure, the storage device 102 and the external trusted host 311 may exchange access information 548 that authenticates the connection between the external trusted host 311 and the storage device 102. For example, the access information 548 may indicate an identity of the external trusted host 311 and/or may indicate a security protocol that is agreed upon between the external trusted host 311 and the storage device 102.

In some other embodiments, the access information 548 may include a signature or key to the storage device 102, which may be authenticated by the encryption core 132 using a private key or other cryptographic hash function. In further embodiments, the access information 548 may include a digital certificate that authenticates the identity and/or security of the external trusted host 311 (e.g., via a trusted third party and/or authentication organization), and the encryption core 132 may verify and/or authenticate the external trusted host 311 using the digital certificate.

The foregoing embodiments provides some illustrative examples of ensuring the security and/or integrity of clear data when accessed by an external device, and is not intended to be comprehensive. The external trusted host 311 may be validated and/or authenticated according to one or more of any known/conventional validation and/or authentication procedures. The present disclosure comprehends such procedures, and therefore, the storage device 102 may be configured with one or more of any described and/or similar mechanisms designed to ensure the security and/or validity of the external trusted host 311.

Because the encrypted data 545 is tagged according to the tag 544 of the read command 541, the encryption core 132 may provide the decrypted data 547 to the post-processing block 133 for use in a post-processing operation implemented via the external trusted host 311. In some embodiments, the post-processing block 133 may send the decrypted data 547 over the bus/network 309 to the external trusted host 311 via the external host interface 307, e.g., when the encryption core 132 makes the decrypted data 547 available to the post-processing block 133. Responsively, the external trusted host 311 may execute a post-processing operation corresponding to the tag 544. Subsequently, the external trusted host 311 may send the result 549 of the post-processing operation over the bus/network 309 to the post-processing block 133 via the external host interface 307. As with the decrypted data 547, the result 549 may be in the clear, and therefore, the result 549 may be secured on the storage device 102 in the post-processing block 133, e.g., through a firewall effected by the encryption core 132.

In some other embodiments, the external trusted host 311 may execute a post-processing within a memory location of the post-processing block 133. For example, the post-processing block 133 may serve as on-drive RAM that is accessible by the external trusted host 311 over the bus/network 309 via the external host interface 307. The encryption core 132 may deposit decrypted data 547 in the memory location of the post-processing block 133, and the encryption core 132 and/or post-processing block 133 may signal to the external trusted host 311 that the decrypted data 547 is in the clear and accessible by the external trusted host 311 over the bus/network 309.

According to such other embodiments, the post-processing block 133 may serve as some memory for the external trusted host 311, and the external trusted host 311 may execute a post-processing operation corresponding to the tag 544 using the memory of the post-processing block 133. For example, the external trusted host 311 may access and manipulate the decrypted data 547 in the memory available at the post-processing block 133, e.g., by executing a post-processing operation corresponding to the tag 544 on the decrypted data 547 located in the memory of the post-processing block 133. Therefore, clear data, whether that be the decrypted data 547, the result of the post-processing operation, and/or any intermediary/auxiliary data, may remain on the storage device 102 within the portion secured by the encryption core 132.

Subsequently, the external trusted host 311 may continue using the post-processing block 133 to store the result 549 of the post-processing operation. The result 549 may be in the clear, but secured by the encryption core 132. In response to the read command 541 including the tag 544, the result 549 may be transferred to the host device 104 via the host interface 106. For example, the encryption core 132 and/or the post-processing block 133 may send the result 549 over the bus/network 108 to the host device 104 via the host interface 106.

In some other embodiments, the storage device 102 may receive a read command 521 that lacks any tags from the host device 104. The read command 521 may be provided to the frontend complex 504, such as to the encryption core 132 via the host interface 106. In response to the read command 521, encrypted data 523 may be retrieved from the NVM 110. For example, the encryption core 132 and/or controller 123 may fetch the encrypted data 523 from the NVM 110 according to a set of logical addresses and a length included in the read command 521.

According to some configurations, the encrypted data 523 may be scheduled for fast path acceleration, e.g., so that the encrypted data 523 may be retrieved via DMA, and fetched from NVM 110. Still within the backend complex 506, the encrypted data 523 may be provided to the ECC 135. The ECC 135 may decode the encrypted data 523, which may detect and correct one or more errors present in the encrypted data 523, although the encrypted data 523 may be non-clear even after decoding.

The (decoded) encrypted data 523 may be provided to the encryption core 132. At the encryption core 132, the encrypted data 523 may be decrypted in order to obtain decrypted data 525. The decrypted data 525 may be raw data that is in the clear, but the encryption core 132 may continue to protect the decrypted data 525 on the storage device 102.

Subsequently, the decrypted data 525 may be transferred from the encryption core 132 to the host device 104 via the host interface 106 based on the read command 521. As the read command 521 may not cause the encrypted data 523 to be tagged, the post-processing block 133 may be avoided, and so no overhead may be incurred by the post-processing block 133 in the process of providing the decrypted data 525 to the host device 104 in response to the read command 521.

Figure 6:
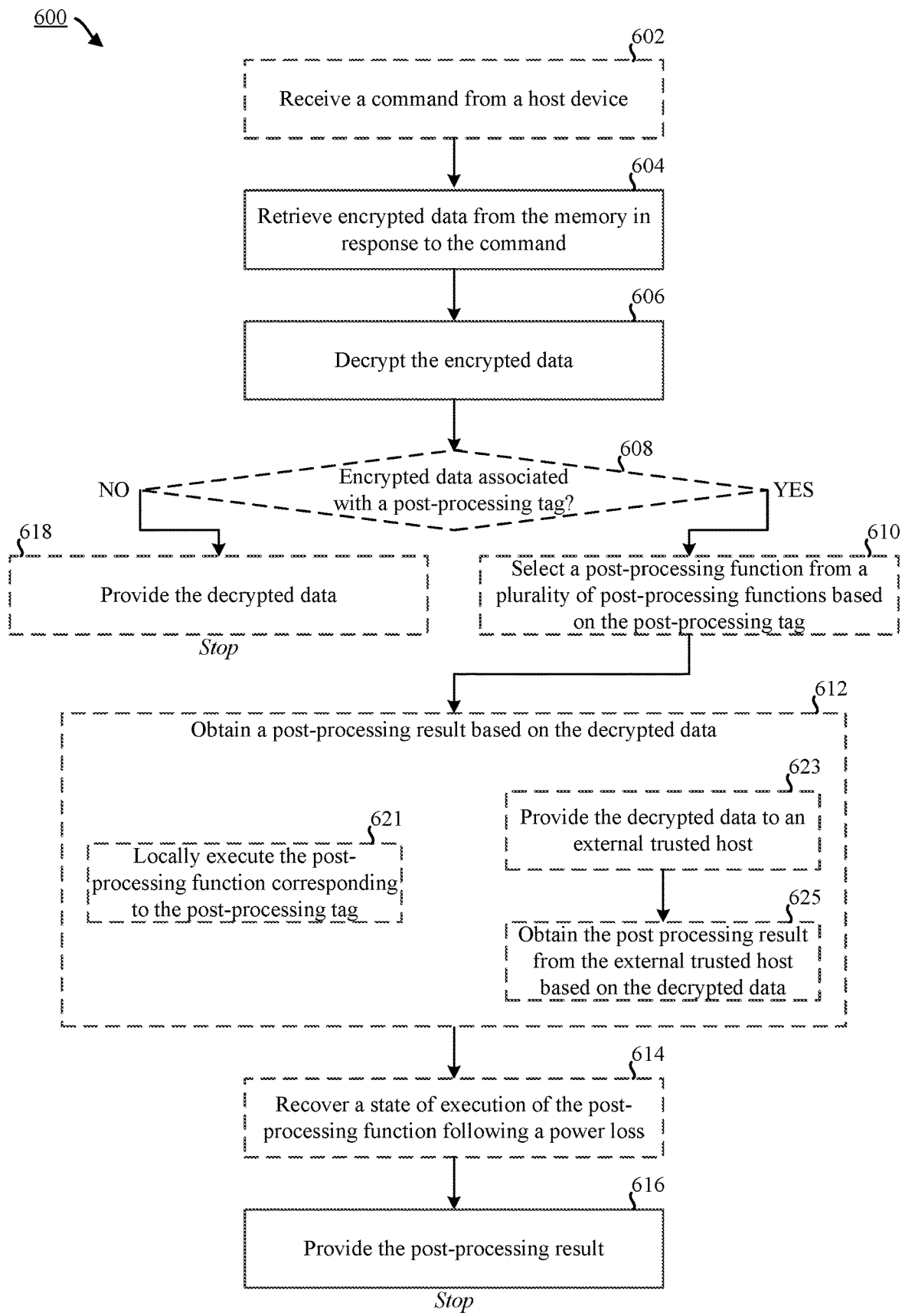
FIG. 6 is a flow chart illustrating an exemplary method for just-in-time post-processing of tagged data by the storage device of FIG. 1 and/or the storage device of FIG. 3.

FIG. 6 illustrates an example flow chart 600 of a method for just-in-time post-processing of tagged data. For example, the method can be carried out in a storage device 102 such as the one illustrated in FIG. 1. Each of the operations of the flow chart 600 can be controlled using an encryption core as described below (e.g., the encryption core 132), a controller (e.g., the controller 123), and/or by some other suitable means. Optional aspects are illustrated in dashed lines.

As represented by block 602, the encryption core receives a read command from a host device. The read command may identify data stored in a memory location of a memory, such as by including one or more logical addresses and, potentially, a length. For example, referring to FIGS. 1 and 3, the encryption core 132 may receive a read command from the host device 104 for data 119 stored in a memory location 112 of the NVM 110.

As represented by block 604, the encryption core retrieves encrypted data from the memory in response to the read command. For example, referring to FIGS. 1 and 3, the encryption core 132 may retrieve data 119 from the NVM 110 in response to a read command from the host device 104. Referring to FIGS. 4 and 5, the encryption core 132 may retrieve encrypted data 445, 545 from NVM 110 in response to the read command 441, 541.

As represented by block 606, the encryption core decrypts the encrypted data. Thus, the encryption core obtains decrypted data, which is in the clear in the encryption core. For example, referring to FIGS. 1 and 3, the encryption core 132 may decrypt the data 119 retrieved from NVM 110. Referring to FIGS. 4 and 5, the encryption core 132 may decrypt the encrypted data 445, 545 in order to obtain decrypted data 447, 547.

As represented by block 608, the encryption core determines whether the encrypted data is associated with a post-processing tag. For example, the encryption core may identify a post-processing tag associated with the encrypted data, and the encryption core may determine that the encrypted data is unassociated with any post-processing tag when the encryption core fails to identify any post-processing tag associated with the encrypted data. In some embodiments, the post-processing tag may be included in the read command received from the host device, and the post-processing tag may be stored (e.g., in volatile memory) during retrieval of the encrypted data to the encryption core. For example, referring to FIGS. 1 and 3, the encryption core 132 may determine whether the data 119 is associated with a tag when encrypted. Referring to FIGS. 4 and 5, the read command 441, 541 may include a tag 444, 544, and the encryption core 132 may determine whether the encrypted data 445, 545 is associated with the tag 444, 544 included in the read command 441, 541 that identifies the encrypted data 445, 545.

As represented by block 610, if the encrypted data is associated with a post-processing tag, the encryption core selects a post-processing function from a plurality of post-processing functions based on the post-processing tag. For example, referring to FIGS. 1 and 3, the encryption core 132 may select a post-processing function available through the post-processing block 133 based on a post-processing tag. Referring to FIGS. 4 and 5, the encryption core 132 may select a post-processing function available through the post-processing block based on the tag 444, 544.

As represented by block 612, the encryption core obtains a post-processing result based on the decrypted data. That is, the encryption core may post-process the decrypted data. Potentially, the post-processing result may be the post-processed decrypted data. For example, referring to FIGS. 1 and 3, the encryption core 132 may obtain a post-processing result based on providing decrypted data to the post-processing block 133. Referring to FIGS. 4 and 5, the encryption core 132 may obtain a result 449, 549 based on providing the decrypted data 447, 547 to the post-processing block 133.

In some embodiments, block 612 may include block 621. As represented by block 621, the encryption core locally executes the post-processing function corresponding to the post-processing tag. The post-processing result may be obtained from the local execution of the post-processing function corresponding to the post-processing tag. As the post-processing result may be obtained based on the decrypted data, the decrypted data may be provided as an input of the post-processing function. Accordingly, the post-processing result may be an output of the post-processing function. For example, referring to FIGS. 1 and 3, the encryption core 132 may cause the post-processing block 133 to locally execute the post-processing operation corresponding to the tag in order to obtain the result of the post-processing operation. Referring to FIG. 4, the encryption core 132 may cause the post-processing block 133 to locally execute the post-processing operation corresponding to the tag 444 in order to obtain the result 449 of the post-processing operation.

In some other embodiments, block 612 may include block 623 and block 625. As represented by block 623, the encryption core provides the decrypted data to an external trusted host. For example, referring to FIG. 3, the encryption core 132 may provide the decrypted data to the external trusted host 311. Referring to FIG. 5, the encryption core 132 may provide the decrypted data 547 to the external trusted host.

As represented by block 625, the encryption core obtains the post-processing result from the external trusted host based on the decrypted data. In some embodiments, the encryption core may receive, in response to sending the decrypted data to the external trusted host, the post-processing result from the external trusted host over a bus and/or network via an external host device interface. In some other embodiments, the encryption core may make the decrypted data available to the external trusted host at a memory location configured in the encryption core, and the external trusted host may deposit the post-processing result in the configured memory location in response to the availability of the decrypted data. For example, referring to FIG. 3, the encryption core 132 may obtain the post-processing result from the external trusted host 311 based on the decrypted data. Referring to FIG. 5, the encryption core 132 may obtain the post-processing result 549 from the external trusted host based on the decrypted data 547.

As represented by block 614, the encryption core recovers a state of execution of the post-processing function following a power loss. For example, referring to FIGS. 1 and 3-5, the encryption core 132 may recover a state of execution of the post-processing block 133 following a power loss.

As represented by block 616, the encryption core provides the post-processing result. For example, the encryption core may provide the post-processing result based on the decrypted data when the encrypted data and/or decrypted data is associated with the post-processing tag. The encryption core may provide the post-processing result to the host device in response to the read command. For example, referring to FIGS. 1 and 3, the encryption core 132 may provide the post-processing result to the host device 104 in response to the read command. Referring to FIGS. 4 and 5, the encryption core 132 may provide the post-processing result 449, 549 to the host device 104 in response to the read command 441, 541.

Finally, as represented by block 618, if the encrypted data is not associated with any post-processing tags, the encryption core provides the decrypted data. The encryption core may provide the decrypted to the host device in response to the read command. Therefore, the encryption core refrains from post-processing the decrypted data when the encrypted data and/or decrypted data is unassociated with any post-processing tag. For example, referring to FIGS. 1 and 3, the encryption core 132 may provide the decrypted data to the host device 104 in response to the read command. Referring to FIGS. 4 and 5, the encryption core 132 may provide the decrypted data 447, 547 to the host device 104 in response to the read command 441, 541.

Accordingly, the storage device described in the present disclosure improves storage device performance according to a configuration that maintains secure storage while also allowing one or more operations to be performed with the data when requested or instructed by a host device. Specifically, the storage device may include an encryption core, which may be configured to decrypt data. Further, the encryption core may be configured to perform one or more post-processing operations on the data once the data is decrypted. Examples of such post-processing operations may include various functions and/or algorithms that accept the data as an input, such as data reduction, data compression, data formatting, and/or data querying. The encryption core may then provide a post-processing result to the host device based on the one or more post-processing operations. Accordingly, the storage device of the present disclosure dynamically processes data in order to provide additional functionality without increasing the overhead and resource consumption commensurate with reading data from the storage device.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage apparatus, comprising:
    a memory; and
    an encryption core configured to:
        receive a read command from a host device, the read command identifying one or more logical addresses associated with encrypted data,
        retrieve the encrypted data from the memory,
        determine whether the read command includes a post-processing tag associated with the encrypted data, the post-processing tag indicating an operation to be performed after the encrypted data is decrypted,
        decrypt the encrypted data, and
            in response to determining that the read command includes the post-processing tag associated with the encrypted data, provide a post-processing result that is based on the decrypted data, wherein the post-processing result is different from the decrypted data, or
            in response to determining that the read command lacks the post-processing tag, provide the decrypted data.

2. The storage apparatus of claim 1, wherein the encryption core is further configured to retrieve the encrypted data from the memory in response to the read command, and provide the decrypted data to the host device in response to the encrypted data being unassociated with any post-processing tags.

3. The storage apparatus of claim 1, wherein the encryption core is further configured to obtain the post-processing result based on the decrypted data in response to the determination that the read command includes the post-processing tag.

4. The storage apparatus of claim 3, wherein the encryption core is further configured to obtain the post-processing result in response to executing the operation corresponding to the post-processing tag, the operation being executed in response to the encrypted data being associated with the post-processing tag, and wherein the decrypted data is an input of the operation.

5. The storage apparatus of claim 4, wherein the encryption core is further configured to select the operation from a plurality of post-processing functions based on the post-processing tag in response to the encrypted data being associated with the post-processing tag.

6. The storage apparatus of claim 4, wherein the encryption core is further configured to recover a state of execution of the operation following a power loss.

7. The storage apparatus of claim 3, wherein, in response to the determination that the read command includes the post-processing tag, the encryption core is further configured to obtain the post-processing result in response to providing the decrypted data to a trusted device external to the storage apparatus and obtaining the post-processing result from the trusted device.

8. The storage apparatus of claim 1, wherein the encryption core is further configured to retrieve the encrypted data in response to the read command that includes the post-processing tag.

9. A storage apparatus, comprising:
    a memory; and
    an encryption core configured to:
        determine whether a post-processing tag associated with encrypted data retrieved from the memory is included in a read command, wherein the post-processing tag indicates an operation to be performed after the encrypted data is decrypted, the read command identifying one or more logical addresses associated with the encrypted data, decrypt the encrypted data in response to the read command, and in response to the post-processing tag being determined to be included in the read command, provide a post-processing result that is based on the decrypted data, or in response to the read command being determined to lack the post-processing tag, provide the decrypted data.

10. The storage apparatus of claim 9, wherein the encryption core is further configured to receive the read command from another device, retrieve the encrypted data from the memory based on the read command, and provide the post-processing result to the another device in response to the post-processing tag being determined to be included in the read command.

11. The storage apparatus of claim 10, wherein in response to the read command including the post-processing tag, the encryption core is further configured to locally store the post-processing tag in a logical-to-physical mapping (L2P) mapping table.

12. The storage apparatus of claim 9, wherein, in response to the post-processing tag being determined to be included in the read command, the encryption core is further configured to obtain the post-processing result in response to locally executing the operation using the decrypted data as a parameter of the operation.

13. The storage apparatus of claim 9, wherein, in response to the post-processing tag being determined to be included in the read command, the encryption core is further configured to provide the decrypted data to a secure device different from the storage apparatus, and obtain the post-processing result from the secure device in response to providing the decrypted data.

14. The storage apparatus of claim 9, wherein the encryption core is further configured to obtain the post-processing result based on the decrypted data and based on the post-processing tag in response to the post-processing tag being determined to be associated with the encrypted data.

15. The storage apparatus of claim 9, wherein, in response to the post-processing tag being determined to be included in the read command, the encryption core is further configured to identify another post-processing tag associated with the encrypted data in the read command, and provide another post-processing result associated with the another post-processing tag based on the decrypted data.

16. A storage apparatus, comprising:

a non-volatile memory; and an encryption core configured to:

retrieve encrypted data from the non-volatile memory in response to a read command, the read command identifying one or more logical addresses associated with the encrypted data, decrypt the encrypted data, determine whether the read command includes a post-processing tag associated with the encrypted data, wherein the post-processing tag indicates an operation to be performed after data decryption, and either:

post-process the decrypted data in response to determining that the read command includes the post-processing tag, or refrain from post-processing the decrypted data in response to determining that the read command lacks the post-processing tag.

17. The storage apparatus of claim 16, further comprising:

volatile memory;

wherein to determine whether the read command includes the post-processing tag associated with the encrypted data, the encryption core is configured to:

identify whether the post-processing tag is stored in the volatile memory in association with the one or more logical addresses identified in the read command.

18. The storage apparatus of claim 16, wherein, in response to determining that the read command includes the post-processing tag, the encryption core is further configured to locally post-process the decrypted data.

19. The storage apparatus of claim 16, wherein, in response to determining that the read command includes the post-processing tag, the encryption core is further configured to provide the decrypted data to a trusted apparatus external to the storage apparatus.

20. The storage apparatus of claim 16, wherein, in response to determining that the read command includes the post-processing tag, the encryption core is further configured to send the post-processed, decrypted data to the host device in response to the read command.

* * * * *